Feb. 5, 1952  H. P. RILEA  2,584,228
RECORD DEVICE

Filed Nov. 4, 1947  2 SHEETS—SHEET 1

Inventor

Howard P. Rilea

By *Clarence A. O'Brien
and Harvey B. Jacobson*
Attorneys

Feb. 5, 1952     H. P. RILEA     2,584,228
RECORD DEVICE

Filed Nov. 4, 1947     2 SHEETS—SHEET 2

Inventor

Howard P. Rilea

By *Clarence A. O'Brien and Harvey B. Jacobson*
Attorneys

UNITED STATES PATENT OFFICE 2,584,228

RECORD DEVICE

Howard P. Rilea, Barnum, Minn., assignor of one-half to Jason A. Eddy, Minneapolis, Minn.

Application November 4, 1947, Serial No. 783,875

2 Claims. (Cl. 281—9)

The present invention relates to new and useful improvements in record devices and more particularly to a device of this character adapted to record data pertaining to dairy farms and the daily amount of milk supplied by cows.

The primary object of the invention is to provide a device of this character for keeping a daily record of milk production for each cow over long periods of time and which may be easily and quickly referred to.

A further object of the invention is to provide means for keeping records of this character in which the record sheet is maintained free from handling to thus keep the same clean and against danger of mutilation.

Another object of the invention is to provide a device of this character which will permit a dairyman to keep detailed and accurate yearly records of milk production and other data relating to each cow for immediate inspection by persons desiring to purchase the cows.

A still further object is to provide a device of this character that is neat and attractive in appearance, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
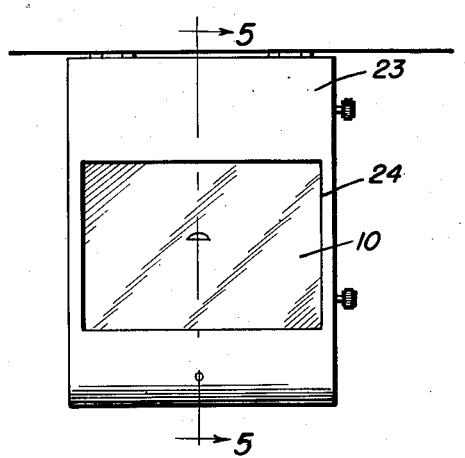
Figure 1 is a top plan view of the invention.
Figure 2:
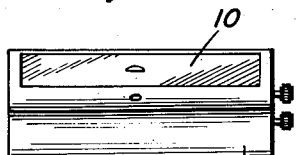
Figure 2 is a front elevational view thereof.
Figure 4:
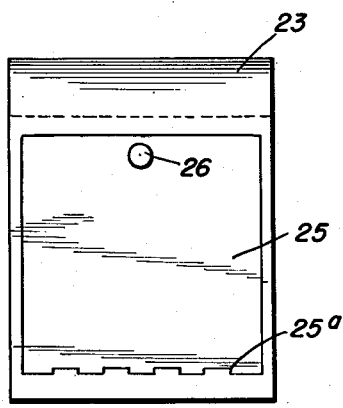
Figure 4 is a bottom plan view.
Figure 3:
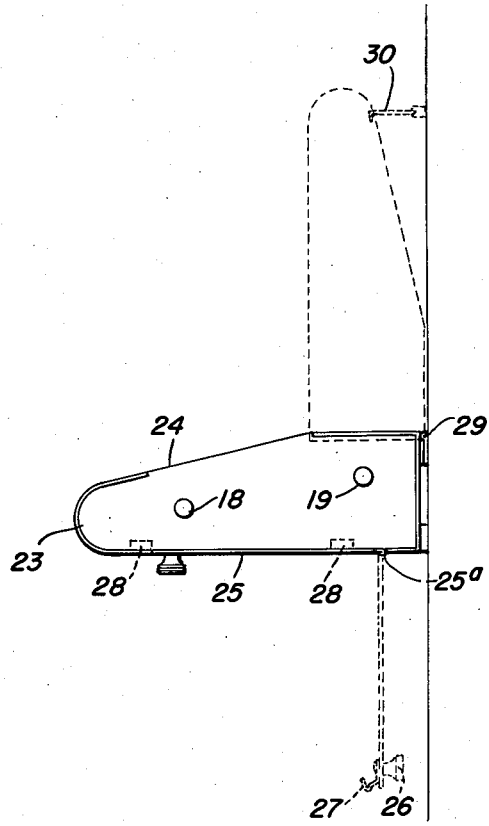
Figure 3 is a side elevational view showing the manner in which the same is supported for recording data thereon and for holding the same in a raised position when not in use.
Figure 5:
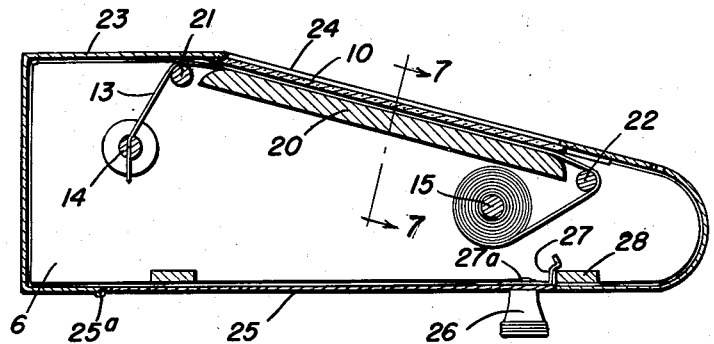
Figure 5 is an enlarged sectional view taken on the line 5—5 of Figure 1.

Referring now to the drawings in detail, wherein for the purpose of illustration I have disclosed a preferred embodiment of the invention, the numerals 5 and 6 represent a pair of spaced parallel side frame members inclined forwardly at their upper edges 7 and 7a.

A pair of grooves 8 are provided along the inner faces of said side frame members adjacent their upper edges, said grooves being adapted to slidably receive the side edges 9 of a glass cover plate 10 having a finger recess 11 for opening and closing the cover for a purpose more fully hereinafter explained.

Figures 6, 7:
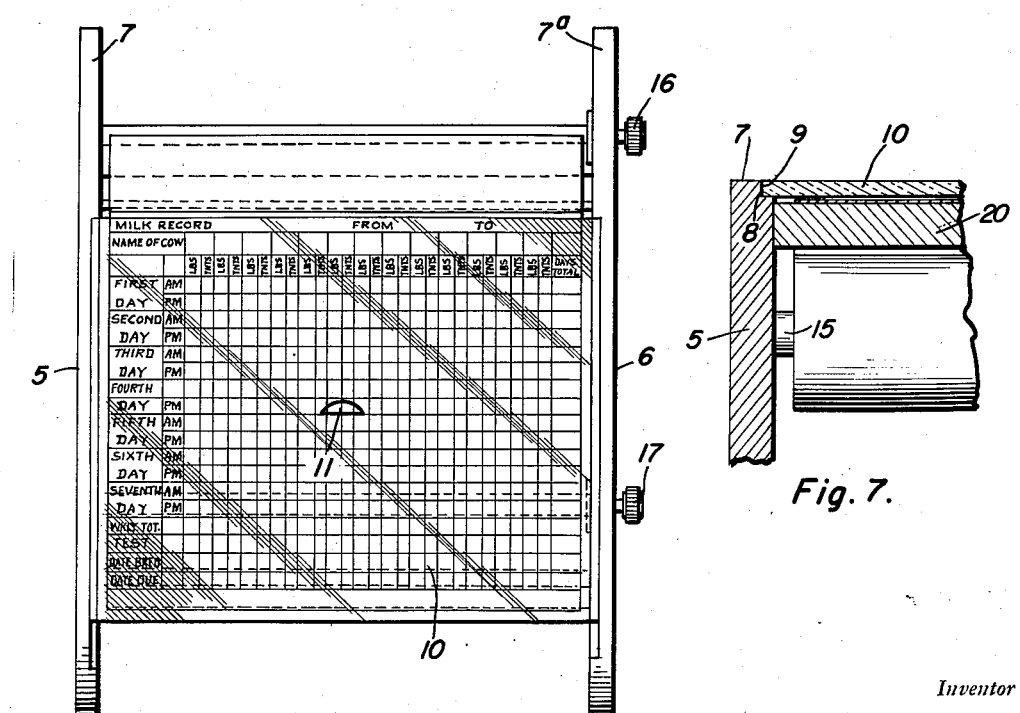
Figure 6 is a top plan view of the frame removed from the case.
Figure 7 is an enlarged sectional view taken on the line 7—7 of Figure 5.

A record sheet is shown at 13 of the type preferably illustrated in Figure 6 and is ruled in a desired manner for recording data thereon. The sheet 13 is rolled by conventional means onto spools or rollers 14 and 15 which are removably journaled in the sides of the frame members 5 and 6. The spools have finger gripping knobs 16 and 17 detachably connected thereto in a conventional manner, such as employed for camera spools.

Secured to the inner surface of the side frame members 5 and 6 and situated beneath glass cover 10 is a shelf or table 20 over which the sheet 13 passes as the sheet is rolled from one spool onto the other.

A pair of stationary guide rods 21 and 22 are suitably held to the side members 5 and 6 adjacent the ends of the table to guide the sheet on the spools.

A case 23 encloses the frame composed of the side frame members 5 and 6 and the double reel and web mechanism mounted thereon, the case having a window opening 24 on its top closed by the cover 10, said case having a bottom door hingedly connected at 25a to the case for swinging downwardly from the case by means of a finger gripping knob 26 extending downwardly from the door to permit entrance into the case.

An L-shaped spring clamp 27 is carried by the screw 27a that extends into knob 26, said clamp being adapted to engage a transverse brace 28 carried at the lower edge of side members 5 and 6 for locking the door in a closed position.

The case 23 is hinged at its upper rear edge 29 to a supporting structure 29a so that the case may be swung upwardly, if so desired, and secured in its raised position by a hook 30.

In the operation of the device, the sheet 13 being placed on the rollers 14 and 15 for winding from one to the other, it is merely necessary to slide glass cover 10 in opening 24 to expose the sheet 13 and by means of which desired data may be recorded on the sheet.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A record device comprising a frame, a double reel and web mechanism supported on the frame, a shelf at the top of the frame over which the web is arranged to travel, said web being adapted for marking data thereon, a case enclosing the frame and having an opening in its top above the shelf, said frame including a pair of spaced apart side members having rabbeted upper edges at their opposed sides, and a transparent cover seated in said rabbeted side edges flush with the top thereof and slidable therein to expose a part of the web under said opening of the case, the top of the case at each side of the opening overlying the cover to hold the cover in the rabbeted edges of the frame.

2. In a record device including an elongated case having a pair of side walls including vertically inclined inturned flanges, a frame positioned in the case and adapted to support a double reel and web mechanism, said frame including a pair of side members disposed alongside of said side walls, said side walls having vertically inclined rabbeted upper edges at their opposed sides underlying said flanges, a vertically inclined shelf supported between the side members and paralleling said rabbeted edges, said case having an upper wall with an opening in registry with said shelf, and a transparent cover overlying the shelf and including side edges slidably received in said rabbeted side edges and underlying said flanges whereby the flanges retaining the side edges of the cover in said rabbeted edges.

HOWARD P. RILEA.

REFERENCES CITED

The following references are of record in the file of this patent:

UNITED STATES PATENTS

| Number | Name | Date |
|---|---|---|
| 493,480 | Childs | Mar. 14, 1893 |
| 577,369 | McIntire | Feb. 16, 1897 |
| 690,366 | Granger | Dec. 31, 1901 |
| 1,134,873 | La Chapelle | Apr. 6, 1915 |
| 1,454,810 | Crowley | May 8, 1923 |
| 1,804,871 | Helland | May 12, 1931 |
| 2,203,053 | Hines | June 4, 1940 |
| 2,341,787 | Johnson | Feb. 15, 1944 |
| 2,428,388 | Shaw | Oct. 7, 1947 |

FOREIGN PATENTS

| Number | Country | Date |
|---|---|---|
| 591,116 | France | Apr. 2, 1925 |